Sept. 9, 1952 L. B. BUTTERFIELD 2,610,275
HUMIDITY SELECTOR SWITCH
Filed Oct. 29, 1949 5 Sheets-Sheet 2

INVENTOR
L. B. BUTTERFIELD
BY
M. C. Parnell
ATTORNEY

Sept. 9, 1952 L. B. BUTTERFIELD 2,610,275
HUMIDITY SELECTOR SWITCH
Filed Oct. 29, 1949 5 Sheets-Sheet 3

INVENTOR
L.B. BUTTERFIELD
BY
W.C. Parnell
ATTORNEY

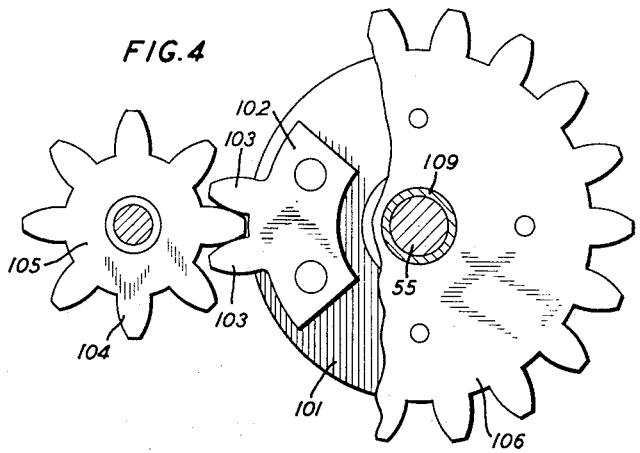
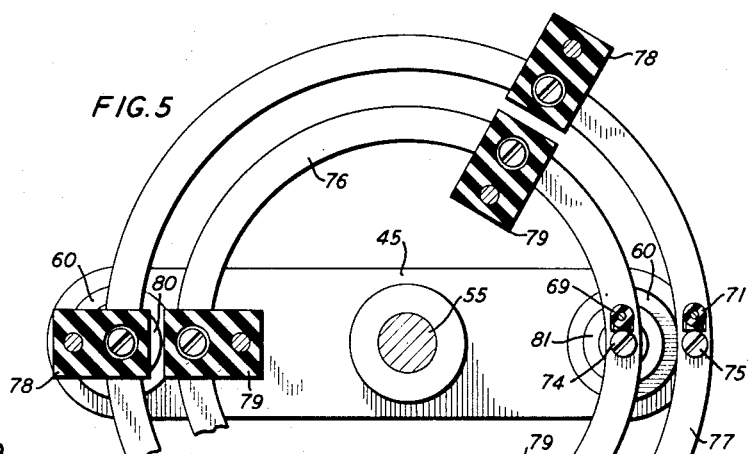
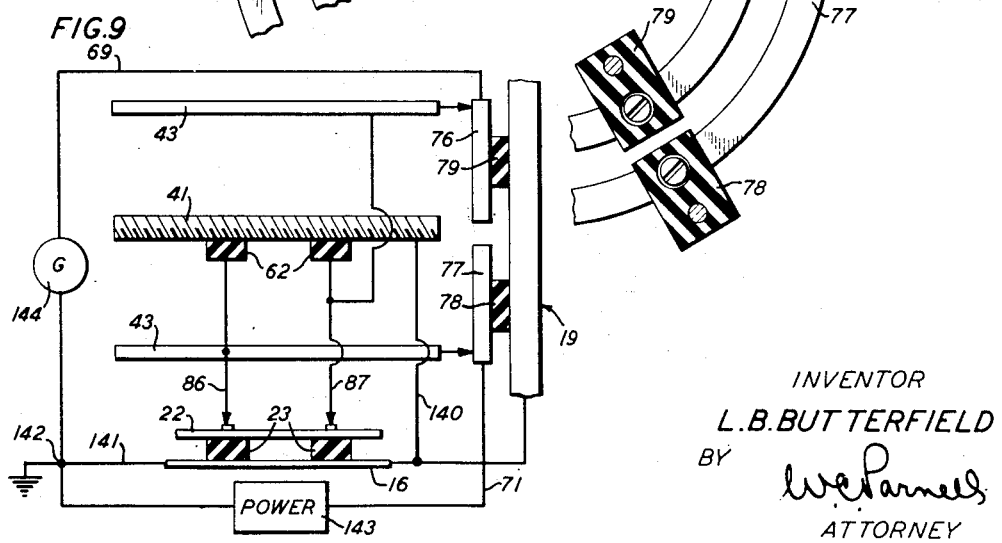

Sept. 9, 1952 L. B. BUTTERFIELD 2,610,275
HUMIDITY SELECTOR SWITCH
Filed Oct. 29, 1949 5 Sheets-Sheet 5
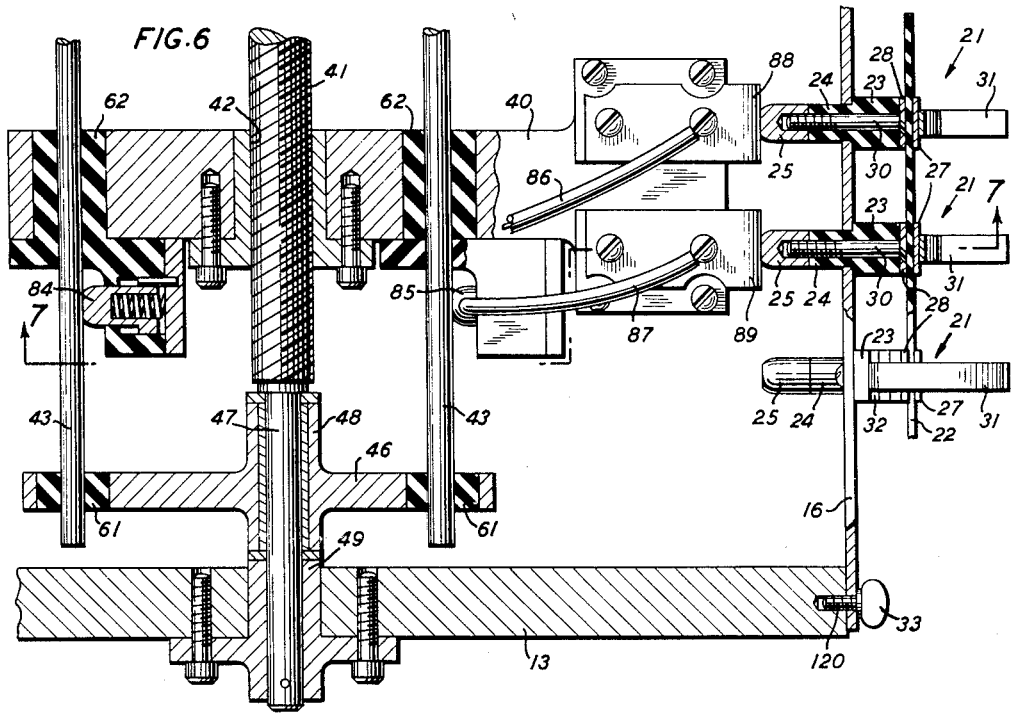
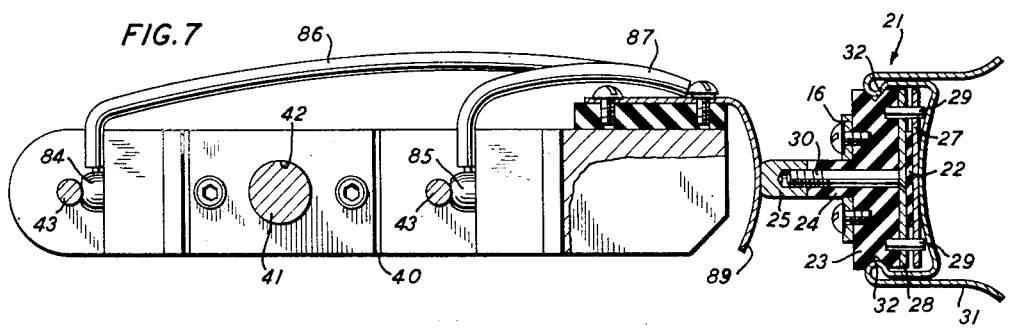
INVENTOR
L. B. BUTTERFIELD
BY
W. C. Parnell
ATTORNEY Patented Sept. 9, 1952

2,610,275

UNITED STATES PATENT OFFICE 2,610,275

HUMIDITY SELECTOR SWITCH

Louis B. Butterfield, Plainfield, N. J., assignor to Western Electric Company, Incorporated, New York, N. Y., a corporation of New York Application October 29, 1949, Serial No. 124,425

2 Claims. (Cl. 200—158)

1

This invention relates to switches and more particularly to electric switches used in the testing of the properties of insulating material.

In measuring the resistance of specimens of insulating material, it is customary to make these measurements within a cabinet whose humidity and temperature are controlled at values representing extreme field conditions. It is also customary to take a plurality of readings on different portions of the same specimen to provide a more accurate picture of the resistance characteristics.

Previous practice has been to fasten lengths of the specimen to be tested to strips having a plurality of equi-spaced terminals which are in electrical contact with adjacent points on the specimen length. The resistance of a certain portion of the length is determined by connecting a source of electrical potential across two adjacent terminals and reading the resistance on a suitable ohmmeter connected in the circuit. This procedure is repeated across the other pairs of adjacent terminals on the strip to obtain the other desired readings.

Since each strip usually has ten or more terminals, and since it is usually desirable to test several lengths of the insulating specimens at the same time, it is obvious that the conventional method of measuring the resistance values requires a great deal of connecting and disconnecting between the potential leads and the strip terminals.

It is therefore an object of this invention to enable a plurality of specimens of insulating materials to be tested in a short time.

Applicant accomplishes his object according to the invention by placing samples to be tested on a plurality of holders which are mounted around the periphery of a selector switch. A contact arm is mounted on a spirally threaded central shaft of the switch and applies a test voltage across the samples as it is moved in a helical path around the shaft. A dial mechanism indicates the position of the contact arm at any given time, and a guard circuit is incorporated in the switch to prevent leakage currents from affecting the test readings.

Other objects and features will be apparent from the following detailed description taken in conjunction with the attached drawings, in which:

Fig. 4 is a partial cutaway view of the gear mechanism for the indicator dial, taken generally along the line 4—4 of Fig. 3;

2

Figure 8:
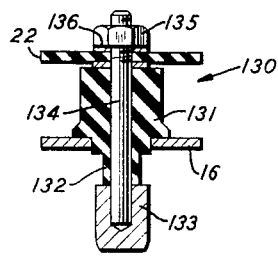
Figure 3:
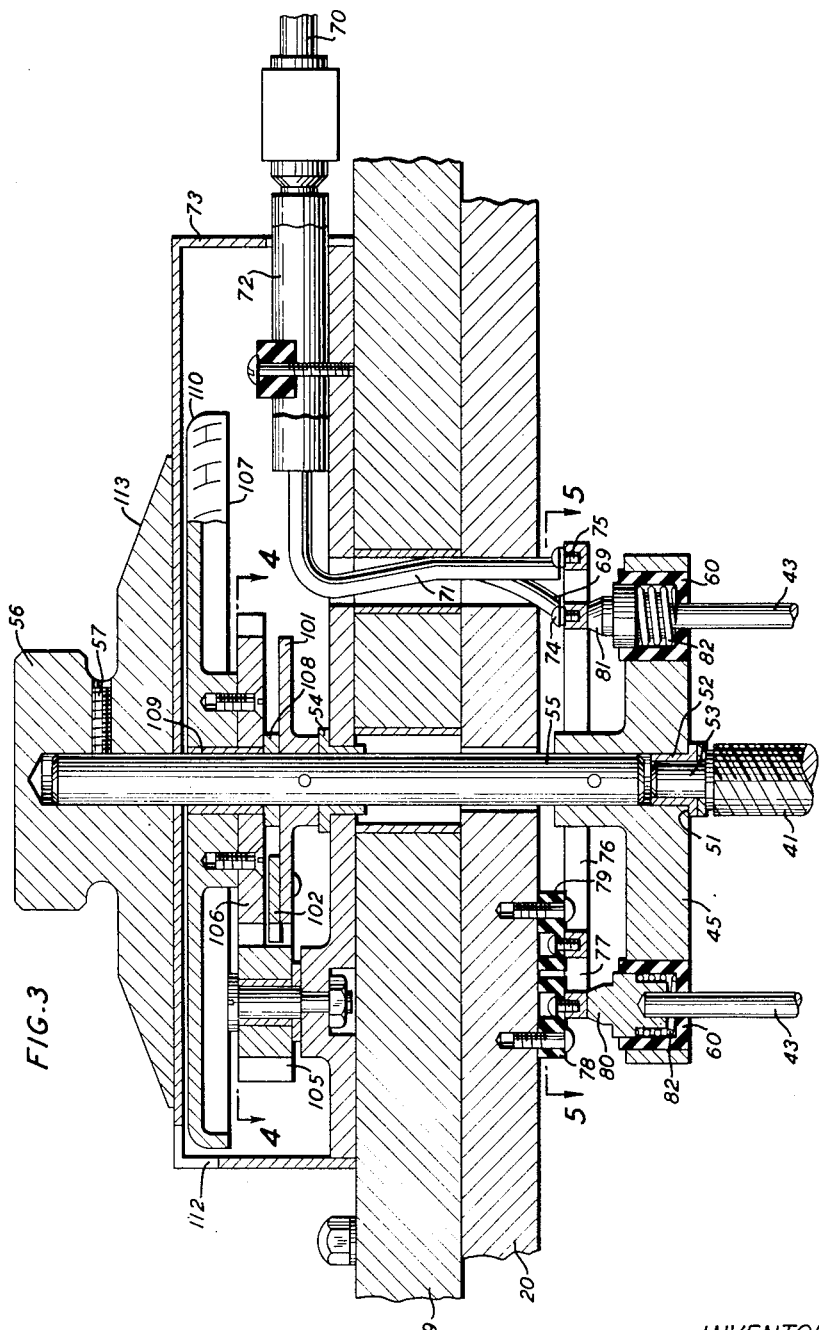
Fig. 3 is a sectional view of the indicating mechanism, taken along the line 3—3 of Fig. 1.

Fig. 5 is a view of the collector ring mounting, taken along the line 5—5 of Fig. 3;

Fig. 6 is a sectional view of the lower part of the switch, showing the manner in which the contact arm applies the test voltage to the various contact terminals;

Fig. 7 is a sectional view of the contact arm and terminal assembly, taken along the line 7—7 of Fig. 6;

Fig. 8 is a sectional view of an alternative type of terminal assembly; and,

Fig. 9 is a schematic diagram of a protective guard circuit for the selector switch.

With reference to the drawings, the selector switch is mounted on and suspended from the underside of a cover 19 of a temperature and humidity control cabinet, which enables the switch to test insulation samples under the controlled conditions within the cabinet.

The stationary part of the switch includes a dodecagonal plate 20 which is mounted on the underside of the cabinet cover 19, and a similar base 13, which is suspended from and held in spaced relation with the plate 20 by supporting bars 14. The sides 15 of plate 20 and base 13 are of equal length and are vertically aligned.

The samples to be tested are placed on vertical mounting strips 16 having slots 17 at one end thereof into which fit pins 18 located in the sides 15 of the plate 20. The other ends of the mounting strips 16 have similar slots 120 which coact with thumb nuts 33, located in the sides of the base 13, to hold the strips in position.

With reference to Fig. 7, it will be seen that each mounting strip 16 contains a plurality of terminal assemblies generally designated as 21, these assemblies being used both to position the insulation samples 22 on the mounting strip and to provide contacts through which the samples are connected to the source of electrical testing power.

Each assembly 21 comprises an insulating block 23 which is bolted or otherwise secured to the mounting strip 16. The block 23 has a projecting portion 24 on which is formed in any suitable manner, a metallic contact terminal 25, the terminal being shown as an extension of the projecting portion 24.

The specimen 22 to be tested is held in place between strips 27 and 28, with the strip 27 being positioned by pins 29 mounted in the block 23 and held firmly against the block by a metallic screw 30 which passes through the block 23 and the terminal 25. The strip 28 is also positioned by the pins 29 and is caused to press against the specimen 22 by a spring clip 31 which is held by spring action in recesses 32 of the insulating block 23. The metallic screw 30 serves to establish electrical contact between the specimen 22 and the terminal 25.

Electrical potential for testing specimens of insulating material is supplied to the specimens through a movable contact arm 40. This arm 40 is rotatably mounted on a stationary central shaft 41 having a spiral threading and the arm has a main bore 42 which is also spirally threaded to mesh with the threaded shaft 41 and allow the arm to move about the shaft.

The contact arm 40 is also slidably positioned on two vertical metallic rods 43 which are held in proper spaced relationship by an upper support 45 and a lower support 46. The lower support 46 is rotatably mounted about an unthreaded extension 47 of the stationary shaft 41 through an integral cylindrical collar 48, with the bottom of the collar 48 resting on a bushing 49 mounted on the base 13. The shaft 41 is maintained stationary through a pin or other suitable means. The upper support 45 rests on a flange 51 of a bushing 52 which is mounted on an extension 53 of stationary shaft 41, the support 45 being freely rotatable about the bushing 52. This support is rigidly mounted on a shaft 55 and the shaft in turn is connected to and suspended from a circular plate 101 which rests on spacer 54. The top of shaft 55 supports a knob 56, which is held in fixed relation with the shaft by set screw 57, so that a movement of the shaft will turn the shaft and thereby the rods 43 and contact arm 40. Integral with the knob 56 is a dial plate 113.

Electrical potential for the testing of the insulation specimens is supplied from an external source through cable 70. Two lead wires 69 and 71 of the cable pass through a sleeve 72 positioned in a housing 73 and are connected to two terminals 74 and 75 corresponding to collector rings 76 and 77. The two collector rings are bolted to the underside of plate 20, and are insulated from the plate by insulating blocks 78 and 79.

Electrical brushes 80 and 81, which are mounted on the upper ends of rods 43, engage the collector rings 76 and 77 respectively in sliding contact, with springs 82 applying pressure to maintain the contact. The brush contact thus extends the testing circuit through the rods 43, through metallic contacts 84 and 85 located on the contact arm 40, and through leads 86 and 87 to curved metallic contacts 88 and 89, also mounted on the contact arm 40. The latter contacts 88 and 89 apply the test voltage to the various pairs of terminals 25 as later described. The tie rods 43 are electrically insulated from contact arm 40 by bushings 62, and from the supports 45 and 46 by bushings 60 and 61.

The selector switch is provided with a dial indicator mechanism to enable the operator to tell the position of the contact arm 40 at any given time. This mechanism is shown in Figs. 3 and 4, and includes the circular plate 101 which has mounted thereon a gear segment 102 having two teeth 103 which mesh with the teeth 104 of a gear 105. The radius of the circular plate 101 is smaller than the effective radius of the gear segment 102 to enable the plate to clear the teeth 104.

Also in engagement with the gear 105 is a gear 106 which is rigidly connected to an indicating disc 107, with both the gear 106 and the indicating disc being rotatably mounted on the shaft 55 by means of spacer 108 and sleeve 109. The edge surface 110 of the disc 107 has uniformly spaced letters A through I around its periphery, with each letter corresponding to a testing position on the twelve mounting strips. For example the letter A corresponds to the testing position made by the first and second contacts, B to the testing position made by the second and third contacts, etc.

When shaft 55 is rotated by the turning of knob 56, the circular plate 101, which is rigidly connected to the shaft, is also turned. Once during every complete revolution of the plate the gear segment 102 engages the gear 105 and rotates it through a small angle. This same angular motion is imparted from the gear 105 to the gear 106 and thereby to the indicating disc 107. The gear train is designed so that if an indicating letter such as A is first centered in the opening 112, a subsequent complete revolution of the knob 56 in the proper direction will cause the letter B to be moved to the center of the opening. However, since the gear segment 102 only moves into engagement with the gear 105 during the last part of the complete revolution made by the knob, the letter A will remain centered in the slot until the contact arm has passed through the A testing position on all twelve mounting strips.

Since the number of the particular mounting strip being contacted by the arm 40 is indicated by the dial plate 113, which is integral with the knob 56, and the particular position on that strip is indicated as described by the letter corresponding to that position, the operator can tell at any time the exact location of the contact arm.

One of the principal features of the invention lies in the use of a threaded central shaft 41 having spiral threading to mesh with corresponding threading in the bore 42 of the contact arm 40 which is thus rotatably mounted on the shaft. When the contact arm is moved by the turning of knob 56, the spiral threading causes the arm to describe a helical path as it moves around the shaft, with the arm moving vertically with relation to the rods 43 as it moves in its spiral path. The terminals on the twelve mounting strips are spaced so that when circumferentially traced from top to bottom or vice versa, they will be found to lie in a helix of the same angle as the path described by the contact arm 40. This means that as the contact arm moves in its helical path in traveling from its uppermost to its lowest position, its contacts 88 and 89 will apply the test leads to each testing position on each mounting strip, starting with position A on each strip and going in order through position I.

The two tie rods 43 serve both a mechanical and an electrical function in the operation of the switch. In addition to transmitting the turning motion from the knob 56 to the contact arm 40, the rods 43 also provide a conductive path through which the testing voltage is advanced to the contact arm.

When it is desired to test the resistance of specimens of insulating material, the cover 19 of the humidity control cabinet is raised high enough to permit access to the switch for loading purposes. This may be done manually or in any suitable manner, it being desirable to provide counterbalancing means for the cover to facilitate the raising operation.

After the cover has been raised, the specimens 22 of insulating material to be tested are placed on the various mounting strips and are held in position as previously described. The cover including the switch is then lowered into position in the humidity cabinet and the temperature and humidity within the cabinet are adjusted to values corresponding to the extreme operating conditions which the insulating material is likely to encounter in actual use. The knob 56 which turns both the contact arm and the indicating means is then turned until the indicating means read I and A, and readings are made of the insulation resistance of the specimen with the contact arm in this test position, with resistance values being indicated on any suitable ohmmeter of resistance measuring device connected in the test circuit. The knob is next turned until the A position on mounting strip 2 is reached, and readings taken at this position. After tests have been made at the A position of the remaining strips 3 through 12, the knob is turned to position B of strip 1. As the contact arm 40 is further moved in its helical path its two contacts 88 and 89 apply the test voltage to all of the remaining test positions in the switch.

Fig. 8 shows another type of terminal assembly 130 which is used as an alternative to assembly 21 for rigid type specimens. As in assembly 21, the alternative structure includes an insulating block 131 positioned in the mounting strip 16, the block 131 having a projecting portion 132 on which is formed a metallic contact terminal 133. The specimens 22 to be tested with this type of contact assembly are drilled to receive a metallic pin 134 which is frictionally held in the insulating block 131 and the terminal 133. The specimens are thus positioned on a vertically aligned group of pins and are fastened in place by nuts 135 in conjunction with metallic washers 136.

Figure 1:
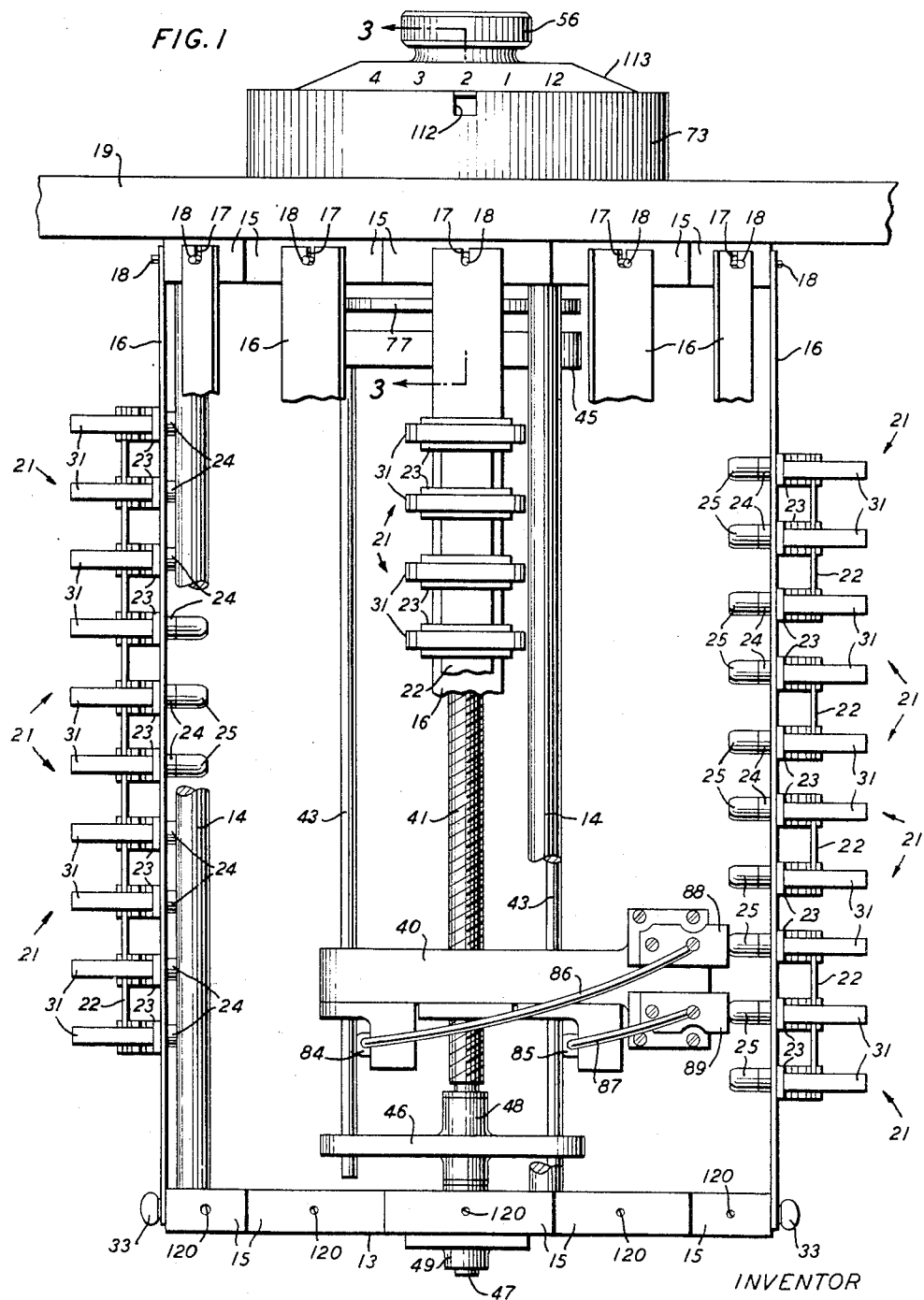
Fig. 1 is a side elevational view of the selector switch.
Figure 2:
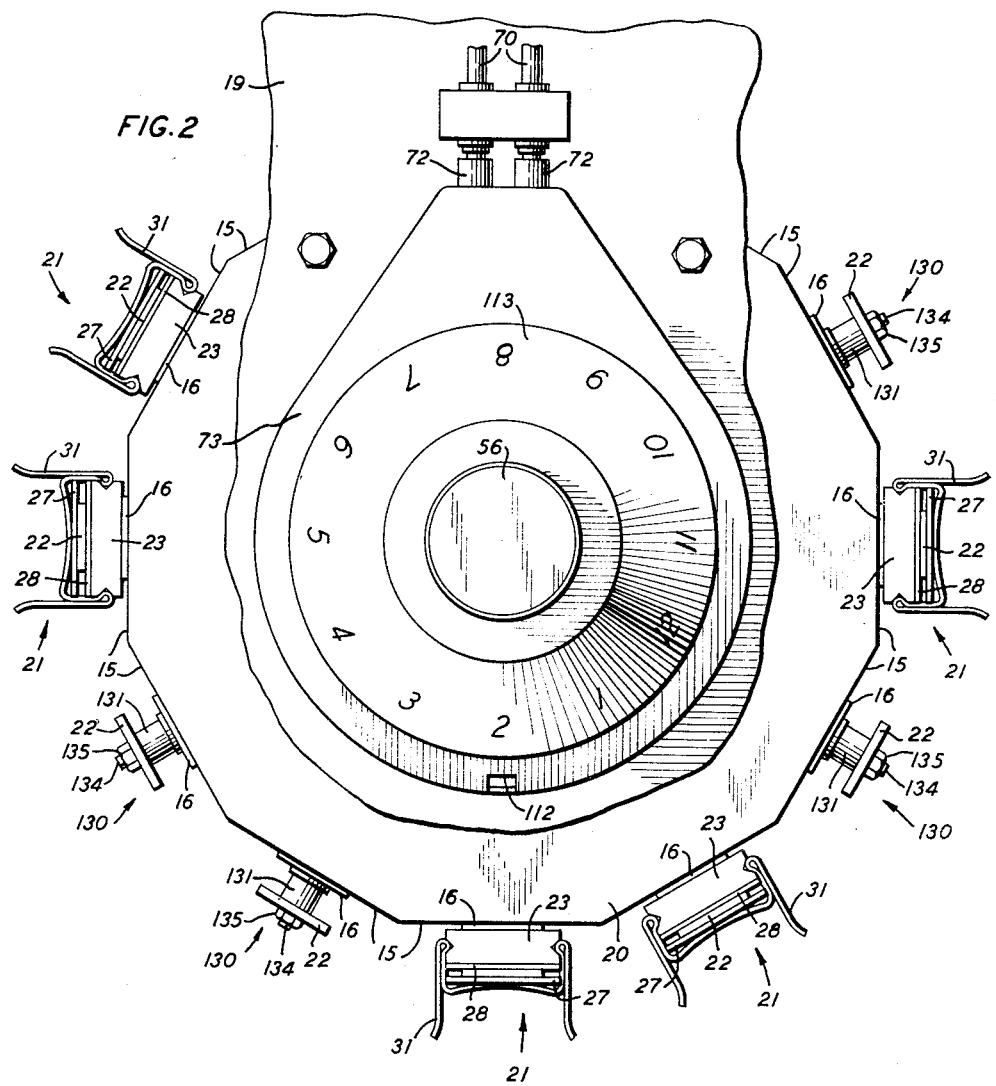
Fig. 2 is a top plan view of the switch.

With the proposed switch, it is usually desirable to test specimens in lengths which cover all of the contact assemblies on a given mounting strip as the nine different resistance readings which are thus obtained give a more reliable picture of the specimen characteristics. However, it is of course possible to test shorter lengths of insulating strips where this is desired. Both the full length and the shorter specimens are shown in Fig. 1.

The exact degree of pitch given to the stationary shaft 41 is not essential to the invention, the only requirement here being that the pitch be coordinated with the planned number and spacing of the terminals 25 across which the test potential is applied.

Fig. 9 shows schematically a circuit of the type conventionally employed to prevent stray currents from affecting the resistance readings. With reference to the drawing, the cover 19, central shaft 41 and mounting strip 16 are connected by leads 140 and 141 to grounded point 142 located between the test voltage source 143 and a galvanometer 144 for indicating the resistance of the test specimens.

The resistance of the insulation used in the switch is often comparable to that of the specimens being tested, and provide a plurality of parallel paths for the test circuit, which in the absence of a guard circuit, causes the indicator to give an incorrect reading of the specimen resistance. When a guard circuit as shown is used, a direct path to ground is provided for these leakage areas independent of the galvanometer circuit.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an electrical switch, the combination with a generally cylindrical support and a plurality of strips mounted on the support for positioning specimens to be tested, of a helically threaded shaft centrally positioned for rotation about its axis in the support and held against axial movement, an arm having a bore short of its ends which is helically threaded to engage the shaft threading and allow movement of the arm about the shaft, a pair of contacts mounted on the arm, a plurality of aligned and equi-spaced electrical terminals located on each strip all of which lie in the potential helical path of the arm contacts, bushings of dielectric material disposed in spaced apertures in the arm parallel with the threaded bore, parallel rods of conductive material extending through their respective dielectric bushings, a rotatable knob, means operatively connecting the knob to the rods whereby rotation of the knob will move the rods in circular paths about the axis of the shaft to establish electrical connection between the pair of arm contacts and the successive pairs of adjacent terminals on each of the strips in turn, and separate means forming wiping contact with their respective rods electrically connecting the rods to their respective contact.

2. In an electrical switch, the combination with a generally cylindrical support and a plurality of strips mounted on the support for positioning specimens to be tested, of a helically threaded shaft centrally positioned for rotation about its axis in the support and held against axial movement, an arm having a bore short of its ends which is helically threaded to engage the shaft threading and allow movement of the arm about the shaft, a pair of contacts mounted on the arm, a plurality of aligned and equi-spaced electrical terminals located on each strip all of which lie in the potential helical path of the arm contacts, bushings of dielectric material disposed in spaced apertures in the arm parallel with the threaded bore, parallel rods of conductive material extending through their respective dielectric bushings, a rotatable knob, means operatively connecting the knob to the rods whereby rotation of the knob will move the rods in circular paths about the axis of the shaft to establish electrical connection between the pair of arm contacts and the successive pairs of adjacent terminals on each of the strips in turn, and separate means forming wiping contact with their respective rods electrically connecting the rods to their respective contact, stationary rings of conductive material disposed in an electrical circuit and corresponding in size to the paths of their respective rods, brushes carried by adjacent ends of the rods to engage their rings and maintain electrical connection therewith during movement of the rods.

LOUIS B. BUTTERFIELD.

REFERENCES CITED

The following references are of record in the file of this patent:

UNITED STATES PATENTS

| Number | Name | Date |
| --- | --- | --- |
| 1,606,153 | Douglas | Nov. 9, 1926 |
| 1,763,953 | Cohen | June 17, 1930 |
| 2,036,305 | Snyder | Apr. 7, 1936 |
| 2,472,230 | Reinschmidt | June 7, 1949 |
| 2,499,720 | Boynton | Mar. 7, 1950 |